United States Patent [19]

Takai et al.

[11] Patent Number: 4,963,441

[45] Date of Patent: Oct. 16, 1990

[54] LIGHT-STORING GLAZES AND LIGHT-STORING FLUORESCENT CERAMIC ARTICLES

[75] Inventors: Ryuzo Takai; Masao Miyadai, both of Shiga, Japan

[73] Assignee: Shiga Prefecture, Otsu, Japan

[21] Appl. No.: 808,853

[22] Filed: Dec. 13, 1985

Related U.S. Application Data

[63] Continuation of Ser. No. 613,656, May 24, 1984, abandoned.

[51] Int. Cl.$^5$ .................... B32B 18/00; C09K 11/00
[52] U.S. Cl. ...................... 428/690; 252/301.65; 428/426; 428/446; 428/698
[58] Field of Search ............ 428/690, 698, 446, 426; 252/301.65

[56] References Cited

U.S. PATENT DOCUMENTS

| | | | |
|---|---|---|---|
| 4,035,819 | 7/1977 | Nitta et al. | 428/698 |
| 4,319,161 | 3/1982 | Looye et al. | 428/690 |
| 4,326,007 | 4/1982 | Williams et al. | 428/690 |
| 4,376,145 | 3/1983 | Frame | 428/690 |
| 4,416,933 | 11/1983 | Antson et al. | 428/698 |
| 4,418,118 | 11/1983 | Lindors | 428/698 |

*Primary Examiner*—Ellis P. Robinson
*Attorney, Agent, or Firm*—Buchanan Ingersoll; Michael L. Dever

[57] ABSTRACT

A light-storing glaze comprising (a) a mixture of base components for a frit consisting of: per 100 parts by weight of the mixture (a), about 10 to about 50 parts by weight of $B_2O_3$, about 1 to about 20 parts by weight of $Al_2O_3$, 0 to about 10 parts by weight of ZnO, about 2 to about 15 parts by weight of $Na_2O$, 0 to about 60 parts by weight of $SiO_2$, 0 to about 15 parts by weight of CaO, 0 to about 5 parts by weight of $K_2O$ and 0 to about 5 parts by weight of MgO, and (b) about 20 to about 80 parts by weight of sulphide-type light-storing fluorescent material per 100 parts by weight of the mixture (a), and a light-storing fluorescent ceramic article having a surface coated with such glaze.

8 Claims, No Drawings

LIGHT-STORING GLAZES AND LIGHT-STORING FLUORESCENT CERAMIC ARTICLES

This application is a continuation of our copending Ser. No. 613,656 filed May 24, 1984, now abandoned.

This invention relates to light-storing fluorescent or light-storing luminescent ceramic articles and to glazes useful in glazing such ceramic articles.

Light-storing fluorescent materials are those having a property of storing the radiant energy of visible ray, ultraviolet ray or the like and gradually giving it out in the dark to cause fluorescent or luminescent phenomenon (hereinafter referred to as "light-storing fluorescence"), and various kinds of materials are known to produce this phenomenon. Of the conventional materials having this property, sulphide-type light-storing fluorescent materials such as ZnS, CdS and the like are mainly used because they possess an outstanding luminescent property and ability to sustain afterglow or namely to prolong afterglow time (hereinafter referred to as "aferglow-sustaining ability"). In use, these sulphide-type light-storing fluorescent materials are mixed with polyvinylchloride resin or like plastics material to produce a shaped product of plastics or coat the surface of a shaped product of plastics. Such sulphide-type materials have been used in manufacture of products intended for use in the dark or at nighttime such as specific signs, decorations, illuminators and so on, although the materials are poor in weather resistance, heat resistance, abrasion resistance and other properties. While light-storing fluorescent materials have found use also in fields of fluorescent enamels, fluorescent artificial stone and like products, they have failed to produce satisfactory results in these fields since the products obtained have a fluorescence significantly reduced by oxidative decomposition of the sulphide during the baking of ceramic articles coated with the fluorescent material at a temperature of 740° C. or higher.

Bearing in mind the foregoing present situation, we have conducted extensive research in an attempt to produce ceramic articles having an improved light-storing fluorescence and found that when ceramic articles are glazed with a frit of specific composition containing a sulphide-type light-storing fluorescent material, a layer serving to protect the sulphide-type light-storing fluorescent material is formed during the baking of the ceramic article even at a temperature of 740° C. or higher, whereby the ceramic article thus glazed exhibits a good luminescent property and afterglow-sustaining ability as well as remarkable weather resistance, heat resistance and abrasion resistance inherently possessed by ceramics. Based on this novel finding, we have accomplished this invention.

It is an object of the present invention to provide a novel light-storing glaze.

It is another object of the invention to provide (1) a light-storing glaze which enables the stable protection of the sulphide-type light-storing fluorescent material during the baking of the ceramic article at a high temperature (usually 740° C. or higher), eventually providing the ceramic article with surface coating excellent not only in weather resistance, heat resistance and abrasion resistance but also in luminescent property and afterglow-sustaining ability and (2) a light-storing fluorescent ceramic article produced by use of the glaze.

This invention provides (1) a light-storing glaze comprising (a) a mixture of : per 100 parts by weight of the mixture (a), about 10 to about 50 parts by weight of $B_2O_3$, about 1 to about 20 parts by weight of $Al_2O_3$, 0 to about 10 parts by weight of ZnO, about 2 to about 15 parts by weight of $Na_2O$, 0 to about 60 parts by weight of $SiO_2$, 0 to about 15 parts by weight of CaO, 0 to about 5 parts by weight of $K_2O$ and 0 to about 5 parts by weight of MgO, and (b) about 20 to about 80 parts by weight of sulphide-type light-storing fluorescent material per 100 parts by weight of the mixture (a), and (2) a light-storing fluorescent ceramic article having a surface coated with the glaze comprising (a) a mixture of : about 10 to about 50 parts by weight of $B_2O_3$, about 1 to about 20 parts by weight of $Al_2O_3$, 0 to about 10 parts by weight of Zn, about 2 to about 15 parts by weight of $Na_2O$, 0 to about 60 parts by weight of $SiO_2$, 0 to about 15 parts by weight of CaO, 0 to about 5 parts by weight of $K_2O$ and 0 to about 5 parts by weight of MgO, and (b) about 20 to about 80 parts by weight of a sulphide-type light-storing fluorescent material per 100 parts by weight of the mixture (a).

A glaze or frit for use in producing light-storing fluorescent ceramic article must meet the following requirements.

(A) The frit must not contain any component which forms a colored sulphide on reaction with the sulphide-type light-storing fluorescent material.

(B) During the baking of the ceramic article to form a glazed coat, the frit must produce a vitreous layer for protecting the fluorescent material below a temperature at which the sulphide-type fluorescent material is oxidized to decompose.

(C) The frit must achieve enclosure of the fluorescent material during the baking at high temperatures to stabilize the material and to prevent the crystals of fluorescent material from breaking and decomposing.

(D) The frit must produce coating over the ceramic article body by baking to exhibit a good weatherability, heat resistance and heat abrasion and other excellent properties.

(E) The frit must produce coating having a remarkable luminescent property and afterglow-sustaining ability to an extent no less than the sulphide-type light-storing fluorescent material to which these properties are attributable.

The frit of the present invention can fulfill all of these requirements. For this purpose, however, it is necessary to control the amounts of the components per 100 parts by weight of the frit as follows.

(i) The amount of $B_2O_3$ is about 10 to about 50 parts by weight. If the frit contains less than 10 parts by weight of $B_2O_3$, it has a higher melting point which results in retarded formation of a protective layer for the sulphide-type fluorescent material and in failure to provide coating with afterglow-sustaining ability. The frit containing over 50 parts by weight of $B_2O_3$ has a higher solubility in water, and gives coating with reduced weatherability.

(ii) The amount of $Al_2O_3$ is about 1 to about 20 parts by weight. If less than 1 part by weight of $Al_2O_3$ is present in the frit, the frit flows downward over the ceramic article surface on application because of its higher solubility in water and lower viscosity. The frit containing more than about 20 parts by weight of $Al_2O_3$ has a higher melting point and is difficult to vitrify in the vicinity of a temperature at which the sulphide decomposes, consequently making it difficult to form a layer for protecting the sulphide-type fluorescent material.

(iii) The amount of ZnO is 0 to about 10 parts by weight. If over 10 parts by weight of ZnO is present, the frits produces a coating with lower afterglow-sustaining ability and other surface defects due to its higher melting point and the ready decomposition of the sulphide.

(iv) The amount of $Na_2O$ is about 2 to about 15 parts by weight. With less than 2 parts by weight of $Na_2O$ present, the glaze can not be adhered to the base surface of the ceramic article since it is difficult to flux at the specific temperature $SiO_2$ and $B_2O_3$ which are the main components of the frit. If over 15 parts by weight of $Na_2O$ is present, the frit possesses a sharply reduced melting point and is a glass which readily reacts with the sulphide-type fluorescent material. Such frit readily decomposes and produces foam on the ceramic article surface, failing to form a smooth surface. Further the frit has a higher thermal expansion coefficient so that intrusion is likely to occur and coating with reduced weather resistance is formed.

(v) The amount of $SiO_2$ is 60 parts or less by weight. Above 60 parts by weight, the frit has a higher softening point which is responsible for retarded formation of a protective layer for the fluorescent material and for coating lower in afterglow-sustaining ability. Further such frit fails to provide a smooth and glossy surface coating on the ceramic article.

(vi) The amount of CaO is 15 parts or less by weight. Above 15 parts by weight, the frit has a markedly low softening point and forms a glass which readily reacts with the sulphide, thereby decomposing the fluorescent material and failing to give afterglow-sustaining ability to the coating.

(vii) The amount of $K_2O$ is 5 parts or less by weight. Above 5 parts by weight, the frit possesses a significantly high thermal expansion coefficient, which is apt to cause intrusion which reduces the mechanical strength of the glaze. Such frit is also afforded a lower softening point, providing the glazed surface with lower afterglow-sustaining ability.

(viii) The amount of MgO is 5 parts or less by weight. Above 5 parts by weight, the frit displays a lower activity to stabilize the glaze, and is given a higher softening point, thereby favoring the decomposition of the sulphide and producing coating having reduced afterglow-sustaining ability.

It is well known that the properties of a frit vary depending on the components and their amounts which are closely and complexly related to each other. The statements (i) to (viii) made above are not always sufficient to clarify the relationship between the components.

According to the present invention, the frits incorporates 20 to 80 parts by weight of one or at least two species of sulphide-type light-storing fluorescent materials such as ZnS, CdS, CaS, (ZnCd)S and the like per 100 parts by weight of the frit components. Below less than 20 parts by weight, the glaze is less luminous and suffers a shorter afterglow time. Above 80 parts by weight, a protective layer can not be formed in baking due to the high concentrations of ZnS and like components, thereby failing to give a smooth-surfaced glaze coating.

According to the present invention, a light-storing fluorescent ceramic article is produced by the usual method as follows. A glaze slurry containing 100 parts by weight of base glaze components about 5 to about 300 μm in particle size and 5 to 60 parts by weight of a sulphide-type light-storing fluorescent material about 5 to about 500 μm in particle size is applied to a ceramic article and the coated ceramic body is baked at a temperature of about 650° to about 1100° C. When required, conventional additives including a precipitation inhibitor, deflocculating agent, adhesive and the like can be added. Representative additives are water glass, dextrin, gum arabic, tragacanth gum, polyvinyl chloride, carboxymethyl cellulose, bentonite, acetic acid, etc.

A transparent glaze can be applied over a coating of the present glaze to produce a ceramic article having an improved weather resistance and abrasion resistance. The application of the transparent glaze can be conducted either after the baking of the ceramic article coated with the present glaze or on application of the present glaze, followed in either case by the baking of the ceramic article with the transparent glaze topcoat. The composition of the transparent glaze is in the range of the base frit composition.

Since the light-storing fluorescent ceramic article of the present invention are capable of exhibiting afterglow for a prolonged period of time, they are very useful in manufacture of emergency guiding marks for use in the dark due to power failure, road signs for nighttime purpose, decorations, illuminators, materials for civil engineering works, building material, etc.

The present invention will be described below in more detail with reference to Examples and Comparison Example.

EXAMPLES 1 TO 4 AND COMPARISON EXAMPLE 1

In each Example and in Comparison Example 1, a glaze slurry was prepared by adding 30 parts by weight of ZnS and 55 parts by weight of water to 70 parts by weight of a mixture of base frit components as shown below in Table 1. The slurry was applied to one side of a sintered bare clay plate measuring 5 cm x 6 cm and the coated plate was heated to 800° C. in air over a 4 hour time period and maintained thereafter at the same temperature for 30 minutes.

Table 2 below shows the degree of luminescent property and afterglow time.

TABLE 1

| Glaze composition (wt. %) | Ex. 1 | Ex. 2 | Ex. 3 | Ex. 4 | Comp. Ex. 1 |
|---|---|---|---|---|---|
| $SiO_2$ | 53.0 | 44.5 | 37.9 | 34.5 | 62.3 |
| $Al_2O_3$ | 6.0 | 4.8 | 17.5 | 2.2 | 3.3 |
| $B_2O_3$ | 24.8 | 29.0 | 26.0 | 40.5 | 9.4 |
| CaO | 0.1 | 10.0 | 0.2 | 9.6 | 9.8 |
| MgO | — | 0.3 | 2.0 | 0.1 | 2.4 |
| ZnO | 3.8 | — | — | 0.5 | — |
| $K_2O$ | 2.1 | 1.3 | 4.2 | 0.8 | — |
| $Na_2O$ | 10.0 | 10.0 | 12.2 | 11.8 | 12.8 |

TABLE 2

|  | Example 1 | Example 2 | Example 3 | Example 4 | Comp. Ex. 1 |
|---|---|---|---|---|---|
| Surface appearance | Smooth and glossy | Smooth and glossy | Smooth and semimat | Smooth and glossy | Sintered and cracked |
| Initial fluorescent brightness | High | High | High | High | Low |

TABLE 2-continued

|  | Example 1 | Example 2 | Example 3 | Example 4 | Comp. Ex. 1 |
| --- | --- | --- | --- | --- | --- |
| Afterglow time* | 10 min. 40 sec. | 10 min. 20 sec. | 7 min. 45 sec. | 9 min. 30 sec. | 2 min. 45 sec. |

*The afterglow time was expressed in terms of the time during which one who has entered a dark room from a room subjected to sunlight is able to recognize a test piece in the dark room into which the test piece has been introduced after exposure to sunlight.

We claim:

1. A composition for forming a light-storing glaze layer over a ceramic article comprising (a) a mixture of base components for a frit consisting of: per 100 parts by weight of the mixture (a), about 10 to about 50 parts by weight of $B_2O_3$, about 1 to about 20 parts by weight of $Al_2O_3$, 0 to about 10 parts by weight of ZnO, about 2 to about 15 parts by weight of $Na_2O$, 0 to about 60 parts by weight of $SiO_2$, 0 to about 15 parts by weight of CaO, 0 to about 5 parts by weight of $K_2O$ and 0 to about 5 parts by weight of MgO, and (b) about 20 to about 80 parts by weight of sulphide-type light-storing fluorescent material per 100 parts by weight of the mixture (a).

2. A composition for forming a light-storing glaze layer over a ceramic article as defined in claim 1 in which the mixture (a) of base frit components consists of: per 100 parts by weight of the mixture, about 20 to 40 parts by weight of $B_2O_3$, about 2 to about 20 parts by weight of $Al_2O_3$, 0 to about 5 parts by weight of Zn, about 10 to about 15 parts by weight of $Na_2O$, 0 to about 5 parts by weight of $K_2O$, 0 to about 10 parts by weight of CaO and 0 to about 2 parts by weight of MgO.

3. A composition for forming a light-storing glaze layer over a ceramic article as defined in claim 1 in which the mixture (a) of base frit components consists of: per 100 parts by weight of the mixture (a), about 25 to about 30 parts by weight of $B_2O_3$, about 5 to about 10 parts by weight of $Al_2O_3$, 0 to about 4 parts by weight of ZnO, about 10 to about 12 parts by weight of $Na_2O$, about 1 to about 2 parts by weight of $K_2O$, about 0.1 to about 10 parts by weight of CaO and 0 to about 0.5 part by weight of MgO.

4. A composition for forming a light-storing glaze layer over a ceramic article as defined in claim 1 which contains about 25 to about 35 parts by weight of the sulphide-type light-storing fluorescent material per 100 parts by weight of the mixture (a) of base frit components.

5. A composition for forming a light-storing glaze layer over a ceramic article as defined in claim 1 in which the sulphide-type light-storing fluorescent material is at least one member selected from ZnS, CdS, CaS or (ZnCd)S.

6. A composition for forming a light-storing glaze layer over a ceramic article as defined in claim 5 in which the sulphide-type flourescent material is ZnS.

7. A light-storing fluorescent ceramic article having a surface coated with a glaze comprising (a) a mixture of base frit components consisting of: per 100 parts by weight of the mixture (a), about 10 to about 50 parts by weight of $B_2O_3$, about 1 to about 20 parts by weight of $Al_2O_3$, 0 to about 10 parts by weight of ZnO, about 2 to about 15 parts by weight of $Na_2O$, 0 to about 60 parts by weight of $SiO_2$, 0 to about 15 parts by weight of CaO, 0 to about 5 parts by weight of $K_2O$ and 0 to about 5 parts by weight of MgO, and (b) about 20 to about 80 parts by weight of sulphide-type light-storing fluorescent material per 100 parts by weight of the mixture (a).

8. A light-storing fluorescent fixed clayware as defined in claim 7 in which a transparent glaze having a composition in the range of the base frit composition is applied to the surface coated with the light-storing fluorescent glaze.

* * * * *

UNITED STATES PATENT AND TRADEMARK OFFICE
CERTIFICATE OF CORRECTION

PATENT NO. : 4,963,441

DATED : October 16, 1990

INVENTOR(S) : RYUZO TAKA, MASSAO MIYADAI

It is certified that error appears in the above-identified patent and that said Letters Patent is hereby corrected as shown below:

Column 6, line 35, claim 8, delete "fixed clayware" and insert --ceramic article--.

Signed and Sealed this

Fourteenth Day of January, 1992

Attest:

HARRY F. MANBECK, JR.

*Attesting Officer*  *Commissioner of Patents and Trademarks*